US006032779A

United States Patent [19]

McAlister et al.

[11] Patent Number: 6,032,779

[45] Date of Patent: Mar. 7, 2000

[54] CONTROL OF MAGNETIC PRINTED SHEETS

[75] Inventors: John C. McAlister; Philip J. Heelan, both of Dundee, United Kingdom

[73] Assignee: NCR Corporation, Dayton, Ohio

[21] Appl. No.: 09/061,312

[22] Filed: Apr. 16, 1998

[30] Foreign Application Priority Data

Apr. 18, 1997 [GB] United Kingdom .................. 9707907

[51] Int. Cl.7 ............................... G07F 7/04; B65H 3/16; B65H 31/00; G01N 27/72

[52] U.S. Cl. ........................ 194/206; 271/18.1; 271/207; 324/228; 324/239; 324/243

[58] Field of Search .................................... 194/206, 207; 271/18.1, 193, 207; 209/569; 324/206, 228, 239, 243; 235/449

[56] References Cited

U.S. PATENT DOCUMENTS

| | | | |
|---|---|---|---|
| 2,341,639 | 2/1944 | Mathiesen | 271/18.1 |
| 2,814,398 | 11/1957 | Coleman et al. | 271/193 |
| 2,950,799 | 8/1960 | Timms | 194/207 |
| 3,485,358 | 12/1969 | Hooker | 209/567 |
| 4,283,708 | 8/1981 | Lee | 194/206 |
| 4,958,715 | 9/1990 | Suris | 194/206 |

FOREIGN PATENT DOCUMENTS

| | | | |
|---|---|---|---|
| 526277-A2 | 2/1993 | European Pat. Off. | 209/569 |
| 55-101538 | 8/1980 | Japan | 271/18.1 |

*Primary Examiner*—Robert P. Olszewski
*Assistant Examiner*—Bryan Jaketic

[57] ABSTRACT

Banknotes printed with magnetic ink pass through a tri-color age detector 34, and then between a pair of premagnetization rollers (10,12) having opposite magnetic polarity of such strength that the magnetic signature of all banknotes is enhanced to the same level; the notes are then stacked 50 in an electromagnetic stacker 42. Such notes, having magnetic signatures of the same level, can also be recognized and/or validated by magnetic techniques also.

14 Claims, 3 Drawing Sheets

CONTROL OF MAGNETIC PRINTED SHEETS

BACKGROUND OF THE INVENTION

This invention relates to controlling sheets such as banknotes which carry magnetic printing, and relates especially to recognizing, validating, stacking, picking and otherwise handling such notes.

At the time of writing, magnetic printing is used on banknotes in US dollars. It is known that the magnetic signatures of such notes can be used for validation and/or recognition, but the signature weakens with age, making validation and recognition more difficult.

With any banknote, precise physical control is important for dispensing by use of an automated teller machine (ATM); when notes are picked from a stack, double picking must be avoided.

SUMMARY OF THE INVENTION

It is the object of the invention to provide a method and apparatus allowing improved control of magnetically-printed sheets such as banknotes.

According to the invention a method of controlling sheets carrying magnetic printing, characterized by passing the sheets between a pair or rollers of opposite magnetic polarity so as to enhance the magnetic signature of each sheet, and subsequently controlling the sheets by electromagnetic means.

Also according to the invention apparatus for controlling sheets carrying magnetic printing, characterized by comprising a pair of rotatable rollers of magnetizable material; source means to apply opposite magnetic polarity to the rollers; and magnetic sheet control means to which the sheets then pass.

In one arrangement the sheet is a banknote which is controlled by sensing the magnetic signature, which has been enhanced by a passage between the rollers, to recognize or validate the banknote.

In an alternative arrangement, the sheet is a banknote which is controlled by stacking with the polarity of each sheet in a known orientation in a stack of similar banknotes. The banknotes may be stacked in pairs with like poles adjacent, "like pole stacking", or with unlike poles adjacent.

In yet another arrangement the sheet is controlled by use of electromagnetic storage means to direct the sheet into a storage area.

In yet another arrangement the sheet is controlled by use of magnetic pick means to pick the sheet from a stack.

In an important variation, the identity and age of the banknote is determined before passage between the rollers, and the strength of the magnetic field applied to the note by the rollers is varied so that after passage every note carries a magnetic signature of equal strength.

BRIEF DESCRIPTION OF THE DRAWINGS

The invention will now be described by way of example only with reference to the accompanying drawings, in which.

DETAILED DESCRIPTION

Figure 1:
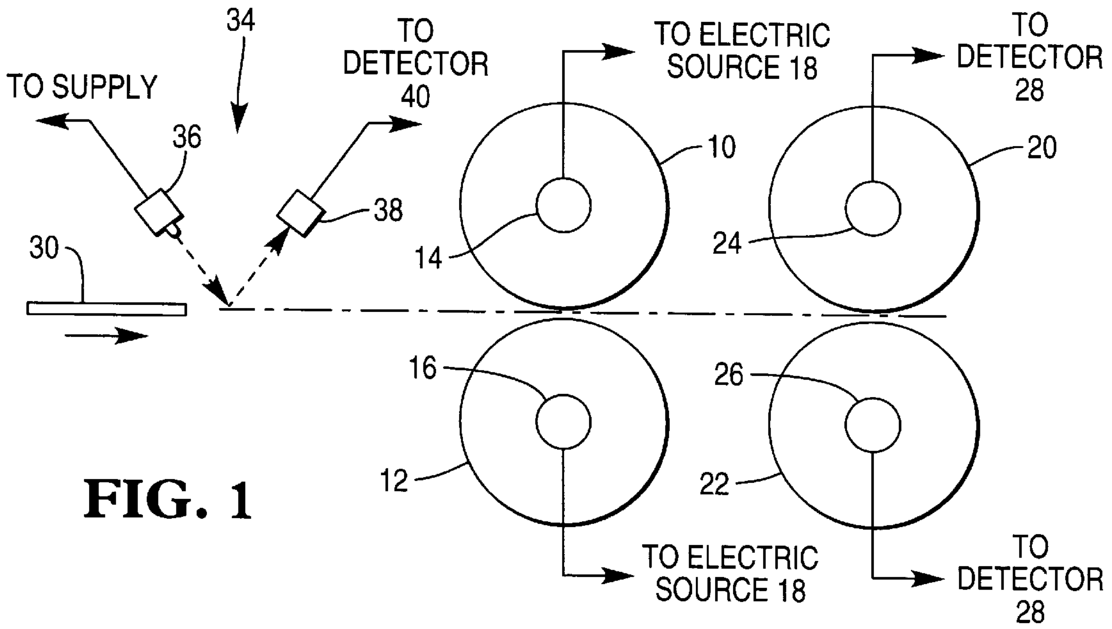
FIG. 1 illustrates schematically in cross section a part of a banknote recognition and/or validation system.

FIG. 1 illustrates a first pair of steel rollers 10,12 each containing an electromagnetic coil 14,16 extending along its axis. The coils are connected to an electric source 18 arranged so that the rollers 10,12 have opposite magnetic polarity.

A second pair of steel rollers 20,22 each also contain an electromagnetic coil 24,26, the coils been connected to a detector 28.

One roller of each pair is arranged to be spring loaded towards the other of the pair, and the pairs are spaced along an axis so that a banknote 30 printed with magnetic ink can pass between the first pair 10,12 and then the second pair 20,22. The first pair of rollers acts as a mechanical feed also.

Before passage between the first pair 10,12 of rollers, the banknote 30 passes through a banknote age determination system 34 such as a tri-color system, indicated schematically by a light source 36 and a sensor 38 connected to a detector 40.

In this embodiment the first pair of rollers 10,12 is the premagnetizing pair; as the note passes between the rollers which have opposite polarity, the magnetic field induced in the note acts to strengthen the magnetic signature of the note, i.e. to increase the magnetic polarization within the magnetic ink printing on the sheet. This premagnetization counteracts the weakening of the signal which occurs with aging.

The age determination system 34 output is supplied to a controller of the electric source 18, which varies the current supply to the coils 14,16 accordingly; the magnetic field applied to the note 30 by the rollers 10,12 is controlled so that all notes of whatever age are premagnetized so as to have the same strength of magnetic signatures. Such equality of magnetic signature results in easier subsequent control, such as stacking and picking.

The premagnetized note then passes between the second pair of rollers 20,22, the sensing pair. As the note passes between the rollers a magnetic field is induced in the coils 24,26 by the polarized magnetic ink of the note, and this field is detected by the detector 28.

The sensing pair of rollers 20,22 is the equivalent of a small read-head such as that used to read a small area of magnetic tape; in the illustrated arrangement, the whole note is read by the rollers.

The detected signal strength is compared with stored values relating to the magnetic signatures of different value notes. The note can therefore be identified and validated. If there is no signal, the note may either be a forgery, or a valid note of different currency which does not bear magnetic ink.

Figure 2:
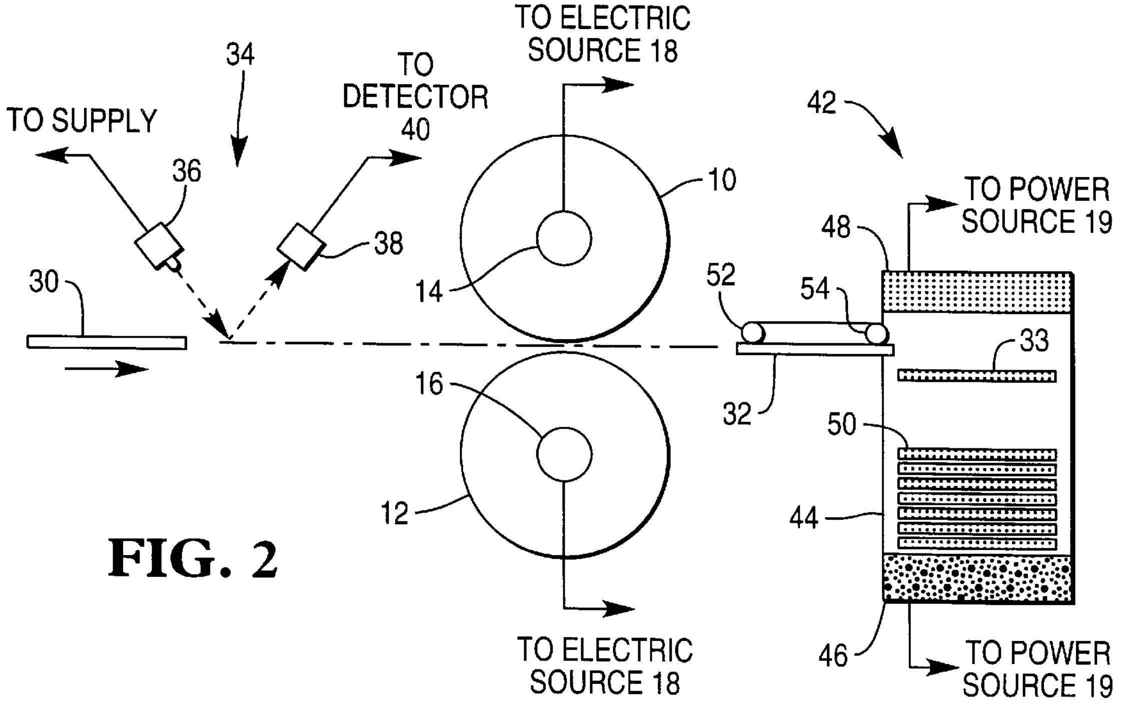
FIG. 2 illustrates a banknote stacking system.

In FIG. 2, the premagnetization rollers 10,12 and banknote age determination system 34 are shown as before.

FIG. 2 also shows an magnetic stacker 42 comprising a container 44 having a floor comprising a first switchable electromagnet 46, with a second switchable electromagnet 48 positioned above the container. The container contains a stack of notes 50, and a note 33 is illustrated just entering the container.

The electromagnets 46,48 are shown to have opposite polarities by different shading, and the same convention is used for the stack 50 and note 33. The notes in the stack 50 are attracted to the lower magnet 46 by their opposite polarity, and the note 33, of the same polarity as the upper magnet 48, is repelled downwards towards the top surface of the stack 50.

FIG. 2 also show a note 32 approaching the stack of 42, under the control of transport rollers 52,54.

Figure 3A:
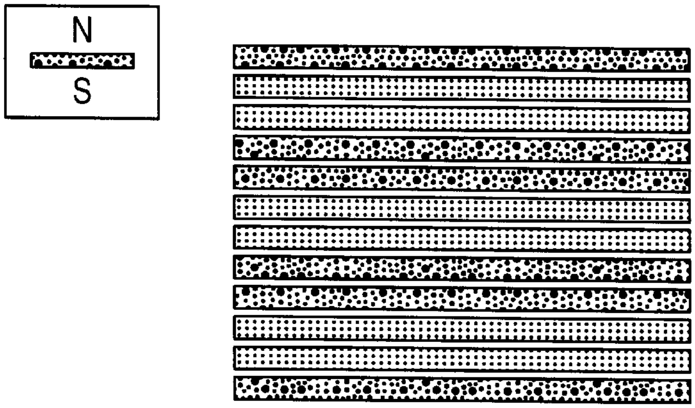
FIGS. 3*a*, 3*b* & 3*c* illustrate respectively two examples of like pole stacking and one example of unlike pole stacking of banknotes.
Figure 3B:
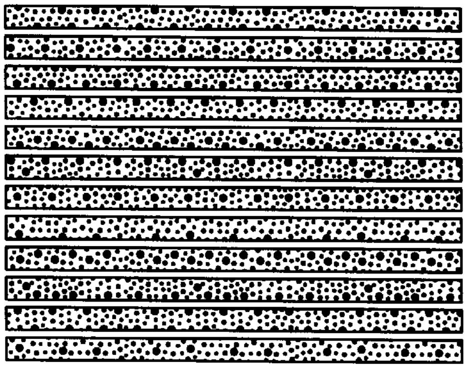

FIG. 3*a* illustrates a stack 56 of banknotes, with pairs of notes of like polarity indicated by the shading convention used above; this is a first example of "like pole stacking". A second example of a "like pole" stack 58 is shown in FIG. 3*b* in which all notes have the same polarity. In such stacks the slight repulsion between notes of the same polarity reduces the risk of double picks in automatic picking systems.

Figure 3C:
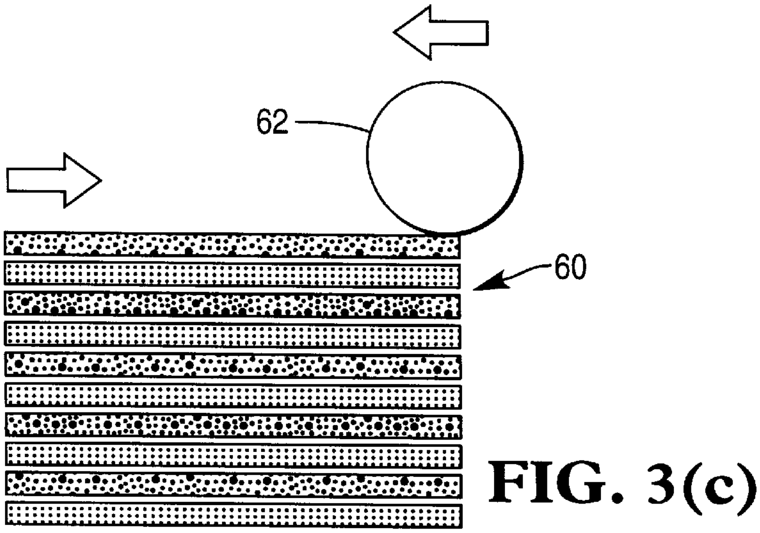

FIG. 3*c* shows "unlike pole stacking"—alternate notes in the stack 60 have different polarity.

The stacking arrangements of FIGS. 3*a* & 3*c* can be achieved by use of the apparatus illustrated in FIG. 2 provided the polarities of the magnets 46 & 48 and of the coils 14,16 can be reversed at sufficiently short time intervals; the polarities are reversed after passage of two notes for the type of stacking illustrated in FIG. 3*a*, and after passage of each note for the type of stacking illustrated in FIG. 3*c*. Such reversal of polarity must be sufficiently fast for note handling at an acceptable speed to be achievable.

Referring once more to FIG. 3*c*, a note picking arrangement is shown schematically. Above the stack of notes 60 is a rotatable picker 62 in the form of a magnetizable roller; by polarizing the picker 62 to have opposite polarity to the top note in the stack 60, that note will be attracted to the roller and can be fed into a note transport path. Thus friction picking is replaced by magnetic picking. The roller polarity is then changed to pick the next note. For use with the stack shown in FIG. 3*a*, polarity is changed every two notes.

Figure 4A:
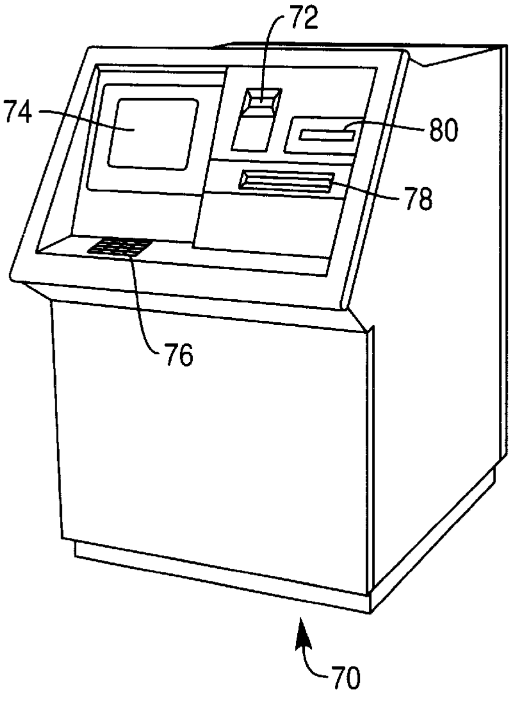
FIGS. 4*a* & 4*b* illustrate an ATM incorporating the invention.
Figure 4B:
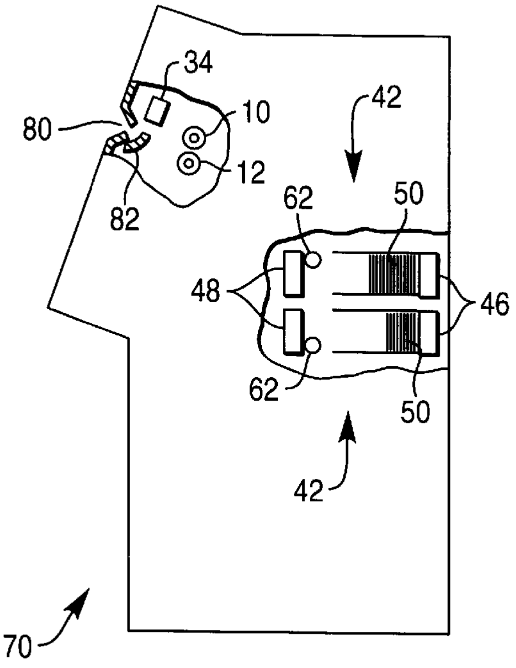

FIG. 4*a* illustrates an automated teller machine 70 incorporating the invention. The ATM has a card input slot 72, a display screen 74, a keypad 76, a cash delivery slot 78, and cash deposit slot 80. FIG. 4*b* shows the ATM in part section. The ATM contains two electromagnetic stackers 42 each having electromagnets 46,48 and electromagnetic pickers 62. The stackers contain stacks 50 of banknotes. The stackers correspond to conventional currency cassettes.

The cash deposit slot 80 is backed by a pivotable protective flap 82. Adjacent the slot is a banknote age determination system 34, and a pair of premagnetization rollers 10,12. Thus for each deposited note the age can be determined by the system 34, and premagnetization rollers 10,12 activated to enhance the magnetic signature to an acceptable level for ease of handling within the electromagnetic stackers and operation by the electromagnetic pickers.

Figure 5:
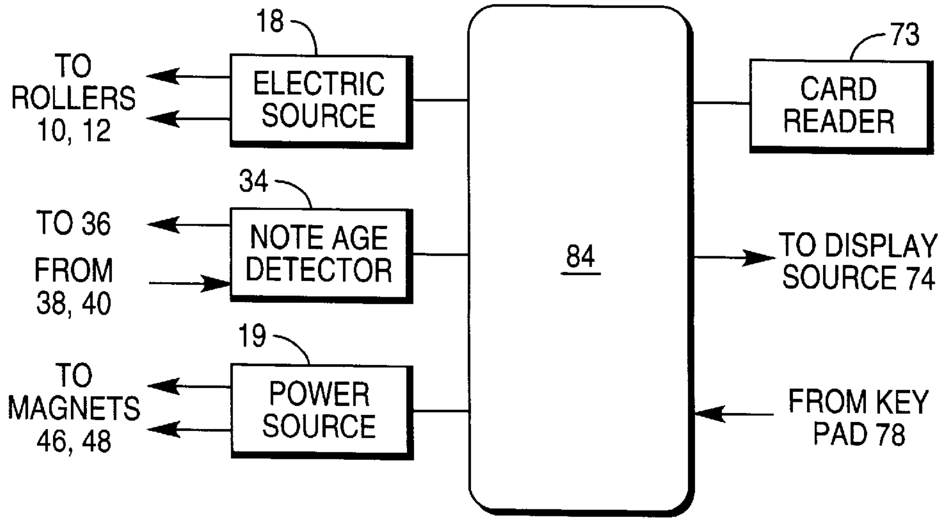
FIG. 5 illustrates control apparatus according to the invention when operated by a personal computer.

FIG. 5 shows a control system for the embodiment illustrated in FIG. 2 based on a PC 84 connected so as to control the electric source 18 and therefore the strength and polarity of the magnetization of the premagnetization rollers 10,12. The PC also receives a signal from the note age detector 34, and controls a power source 19 for the electromagnetic storage device magnets 46,48.

When the control system is included in an ATM, the PC 84 will also be connected, as is conventional, to a card reader 73 behind the card input slot 72, to display screen 74 and the keypad 78.

It is an advantage of application of the invention in ATMs that the existing pairs of metal rollers may easily be modified to operate electromagnetically.

What is claimed is:

1. An apparatus for handling a sheet having a magnetic signature thereon, the apparatus comprising:

a first pair of magnetizable rollers defining a gap through which the sheet can be fed;

a first pair of coils associated with the first pair of rollers;

a magnetic source device for applying a magnetic polarity to one coil and an opposite polarity to the other coil; and control means for controlling the coils to strengthen the magnetic signature on the sheet when the sheet is fed through the gap between the first pair of magnetizable rollers.

2. An apparatus according to claim 1, further comprising a magnetic sheet control device for detecting the strengthened magnetic signature on the sheet.

3. An apparatus according to claim 2, wherein the magnetic sheet control device includes (i) a second pair of magnetizable rollers defining a gap therebetween, and (ii) a second pair of coils associated with the second pair of rollers and for providing a signal indicative of the strength of the magnetic signature when the sheet having the strengthened magnetic signature is fed through the gap between the second pair of magnetizable rollers.

4. An apparatus according to claim 2, wherein the magnetic sheet control device includes magnetic stacking means for stacking sheets at a predetermined magnetic orientation in a stack.

5. An apparatus according to claim 4, wherein the magnetic sheet control device includes magnetic picking means for picking sheets from the stack.

6. An apparatus according to claim 1, further comprising a detection device for detecting age of the sheet and providing a signal indicative thereof, the control means controlling the magnetic source device in response to the signal from the detection device.

7. A method of handling a sheet having a magnetic signature thereon, the method comprising the steps of:

(a) feeding the sheet through a gap defined by a pair of magnetizable rollers associated with a pair of coils; and (b) applying a magnetic polarity to one coil and an opposite polarity to the other coil to strengthen the magnetic signature on the sheet when the sheet is fed through the gap.

8. A method according to claim 7, further comprising the step of:

(c) detecting the strengthened magnetic signature on the sheet.

9. An automated teller machine (ATM) for handling a banknote having a magnetic signature thereon, the apparatus comprising:

a first pair of magnetizable rollers defining a gap through which the banknote can be fed;

a first pair of coils associated with the first pair of rollers;

a magnetic source device for applying a magnetic polarity to one coil and an opposite polarity to the other coil; and control means for controlling the coils to strengthen the magnetic signature on the banknote when the banknote is fed through the gap between the first pair of magnetizable rollers.

10. An ATM according to claim 9, further comprising a magnetic sheet control device for detecting the strengthened magnetic signature on the banknote.

11. An ATM according to claim 10, wherein the magnetic sheet control device includes (i) a second pair of magnetizable rollers defining a gap therebetween, and (ii) a second pair of coils associated with the second pair of rollers and for providing a signal indicative of the strength of the magnetic signature when the banknote having the strengthened magnetic signature is fed through the gap between the second pair of magnetizable rollers.

12. An ATM according to claim 10, wherein the magnetic sheet control device includes magnetic stacking means for stacking banknotes at a predetermined magnetic orientation in a stack.

13. An ATM according to claim 12, wherein the magnetic sheet control device includes magnetic picking means for picking banknotes from the stack.

14. An ATM according to claim 9, further comprising a detection device for detecting age of the banknote and providing a signal indicative thereof, the control means controlling the magnetic source device in response to the signal from the detection device.

* * * * *